United States Patent [19]

Ridgway et al.

[11] 4,303,577
[45] Dec. 1, 1981

[54] POLYAMIDE ANTIOZONANTS

[75] Inventors: James S. Ridgway; Donald A. Holmer; Oscar A. Pickett, Jr., all of Pensacola, Fla.

[73] Assignee: Monsanto Company, St. Louis, Mo.

[21] Appl. No.: 95,865

[22] Filed: Nov. 16, 1979

Related U.S. Application Data

[63] Continuation-in-part of Ser. No. 965,634, Dec. 1, 1978, abandoned.

[51] Int. Cl.³ .................................................. C08K 5/42
[52] U.S. Cl. .............................. 260/45.75 C; 528/313
[58] Field of Search ................. 260/45.75 C, 45.75 R; 528/313; 8/173, 178, 92

[56] References Cited

U.S. PATENT DOCUMENTS

| | | | |
|---|---|---|---|
| 3,039,990 | 6/1962 | Huffman | 260/42 |
| 3,088,956 | 5/1963 | Horn | 260/429.9 |
| 3,113,120 | 12/1963 | Papero et al. | 260/45.75 |
| 3,184,436 | 5/1965 | Magat | 260/78 |
| 3,185,671 | 5/1965 | Horn | 528/313 |
| 3,242,134 | 3/1966 | Papero | 260/45.75 |
| 3,457,325 | 7/1969 | Anton | 260/45.75 C |
| 3,844,713 | 10/1974 | Saunders et al. | 8/165 |
| 3,925,016 | 12/1975 | Haase | 8/169 |
| 4,083,893 | 4/1978 | Lofquist et al. | 528/313 |

*Primary Examiner*—V. P. Hoke
*Attorney, Agent, or Firm*—John W. Whisler

[57] ABSTRACT

Novel compounds produced by reacting 5-sulfoisophthalic acid or a salt thereof (e.g. the potassium salt) with a water soluble copper salt (e.g. cupric acetate monohydrate) are described. The compounds are effective antiozonants for polyamide fibers, particularly, when the fibers are dyed with disperse dyes. Generally, sufficient amounts of the compounds are incorporated into the fibers to provide from 10 to 100 ppm, on weight of fiber, of copper.

7 Claims, No Drawings

POLYAMIDE ANTIOZONANTS

CROSS-REFERENCE TO RELATED APPLICATIONS

This application is a continuation-in-part of copending application Ser. No. 965,634, filed Dec. 1, 1978 and now abandoned.

BACKGROUND OF THE INVENTION (A) Field of the Invention

This invention relates to novel reaction products produced by reacting 5-sulfoisophthalic acid with a water soluble copper salt. Fibers containing such a compound have improved ozone fading resistance when compared to corresponding fibers from which the compound has been omitted. The term "ozone fading" as used herein means color fading of dyed fibers resulting from the dyed fibers being exposed to ozone. The term "fiber" as used herein means spun yarn, continuous filament yarn or a monofilament.

(B) Description of the Prior Art

Polyamide carpet fibers, expecially those dyed with disperse dyes, exhibit considerable fading of color when exposed to low concentrations of ozone at high humidities. Such conditions occur along the Gulf Coastal regions and in areas of high atmospheric pollution.

It has been suggested in the prior art (U.S. Pat. No. 3,844,713) to use certain organic phosphites as antiozonants for polyamide fibers. However, relatively large amounts of the phosphites are required (i.e. 0.1 to 8%).

It was known to applicants prior to the present invention that the ozone fading resistance of polyamide fibers can be improved with the use of certain poly(copper phosphinates) as antiozonants. However, these antiozonants when present in carpet fibers often react with certain disperse dyes (e.g. disperse Red No. 55) during the dyeing of the carpets to produce an uneven coloration in the carpet piles which renders the carpets commercially unacceptable. Such uneven coloration is referred to as "splotching". Normally, carpets are dyed with disperse dyes at a neutral or slightly alkaline pH. While copper-containing fibers can be dyed with disperse dyes at a pH of 3.5 or less without causing splotching, at such pH the copper is leached from the fibers.

Accordingly, an object of this invention to provide effective additives (i.e. antiozonants) for improving the ozone fading resistance of polyamide fibers and also fibers containing such additives.

Another object of the invention is to provide antiozonants for polyamide fibers which when dyed with disperse dyes including disperse Red No. 55, do not cause splotching.

SUMMARY OF THE INVENTION

In accordance with the present invention copper-containing reaction products are provided by reacting at least one 5-sulfoisophthalic acid of the formula

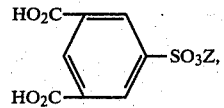

where Z is hydrogen, ammonium or an alkali metal such as lithium, sodium, potassium, or cesium, with at least one water soluble copper salt such as copper acetate.

The reaction products (CuSIA) are particularly useful as antiozonants for polyamide fibers and, therefore, are of particular interest for improving the ozone fading resistance of nylon 6 (polycaprolactam) and nylon 66 (polyhexamethylene adipamide) fibers which are widely used as carpet piling. However, it is contemplated that CuSIA may be used in any polyamide fiber (e.g. nylon 610 and copolyamides such as nylon 66/6, 66/TA, etc.).

Polyamide fibers containing CuSIA, when dyed with disperse dyes, in addition to having improved ozone fading resistance also do not cause splotching.

Applicants have evaluated many copper compounds as antiozonants for polyamide fibers. However, of the copper compounds evaluated the copper compounds of the present invention are the only ones which have not caused splotching in carpets when dyed with disperse Red No. 55 or a mixture of dyes containing disperse Red No. 55. The exact mechanism by which the copper functions as an antiozonant or by which CuSIA avoids splotching is not fully understood.

DETAILED DESCRIPTION OF THE INVENTION

Preferred 5-sulfoisophthalic acids of the formula

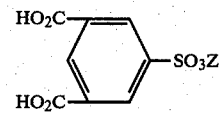

for use in producing CuSIA are those where Z is an alkali metal. Of the alkali metals potassium is the least expensive and therefore is particularly preferred.

Preferred water-soluble copper salts for use in producing CuSIA include cupric chloride, cupric chlorate, cupric lactate, cupric acetate, cupric sulfate and the appropriate hydrates thereof, such as $Cu(CH_3CO_2)_2 \cdot H_2O$.

CuSIA is conveniently produced by reacting at least one 5-sulfoisophthalic acid of the above formula with at least one water-soluble copper salt in a suitable diluent, for example, by heating a solution of the acid and copper salt in a mixture of methanol and water. The exact mechanism by which the copper salt and acid react to produce CuSIA is not fully understood. When the copper salt and acid are used in a mole ratio corresponding to 1 mole or less of copper salt per mole of acid, analysis indicates that copper atoms replace hydrogen atoms of carboxyl groups. When the copper salt is present in a molar excess of a 1:1 mole ratio (e.g. 2:1), analysis indicates that copper atoms also replace Z atoms of sulfonate groups. Therefore, the CuSIA may in certain instances be a mixture of compounds some of which contain more than one copper atom. It is contemplated that any of the CuSIA compounds may be used in practicing the invention, that is, it is not considered important whether the copper atom(s) of the CuSIA be attached to the benzene ring of the sulfoisophthalic acid radical via carboxyl and/or sulfonate groups and/or via a complex. Although any mole ratio of reactants may be used to prepare the CuSIA, preferably, mole ratios of about 0.5:1.0 to 2:1 and most preferably 0.5:1.0 to 1:1, copper compound to acid are used. When the mole ratio is less than 0.5:1.0 or greater than 2:1, the yield of CuSIA tends to be low.

For convenience, the concentration of the CuSIA in the polyamide fibers is expressed in terms of copper.

Usually, polyamide fibers containing on a weight basis sufficient CuSIA to provide as little as about 10 parts per million (ppm) of copper, show improved resistance to ozone fading when compared to the corresponding fibers from which the CuSIA has been omitted. On the other hand, when the copper concentration of a CuSIA-containing polyamide fiber exceeds about 100 ppm, the fiber tends to become noticeably discolored (i.e. off white) due to the presence of the copper. Satisfactory resistance toward ozone fading is obtained with little, if any, discoloration of the polyamide fibers when the fibers contain from about 20 to about 85 ppm of copper added as CuSIA.

The CuSIA may be incorporated into polyamide fibers by techniques commonly employed in the art of incorporating other additives into polyamide fibers. Thus, the CuSIA may be mixed with the polyamide prior to the polyamide being extruded into fibers. Accordingly, when the polyamide fibers are produced by solution spinning, the CuSIA may be mixed with the dope (polymer solution) from which the fibers are shaped. When the polyamide fibers are produced by melt spinning, the CuSIA may be added to the monomers from which the polyamide is produced (e.g. nylon 66 salt solution), to particulate form polymer (e.g. nylon 66 flake) which is subsequently melted and extruded into fiber, or to the molten polyamide just prior to the extrusion thereof into fibers.

In addition to the CuSIA, the fibers of this invention may also contain other additives such as heat stabilizers, delustrants, dye additives or modifiers, viscosity stabilizers, etc.

The following examples are given to further illustrate the invention. In the examples ppm is based on the weight of the polyamide. Also, in Examples 2 and 3 color fading (ozone fading) was measured by AATCC Test Method 129-1968 which expresses fading as a relative Gray Scale value ranging from 1 to 5 with 5 being the least faded and 1 the most faded.

EXAMPLE 1

This example illustrates the preparation of a preferred CuSIA.

Cupric acetate monohydrate (9.98 grams) was dissolved in a solution of 300 ml of methanol and 500 ml of water. The potassium salt of 5-sulfoisophthalic acid (24.62 grams), i.e.,

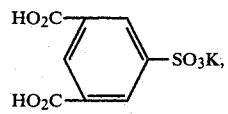

was dissolved in a solution of 250 ml of methanol and 100 ml of water. The copper acetate monohydrate solution was poured into the sulfoisophthalic acid solution. The resulting mixture was stirred and heated gently. A precipitate formed almost immediately. Stirring was continued for 30 minutes. The light blue precipitate was then recovered by filtration, washed twice with 400 grams of warm methanol and, finally, vacuum dried at 85° C. The yield was 19.76 grams (71.3%). The CuSIA turned brown at about 300° C., and melted and bubbled at about 337° C. Analysis of the precipitate showed its copper content to be 15.72% and its potassium content to be 9.71%.

EXAMPLE 2

In this example eight sets of circular knit tubing samples (10 samples to a set) were prepared from eight nylon 66 (polyhexamethylene adipamide) yarns. CuSIA prepared as described in Example 1 was added to four of the yarns and was omitted from the other four yarns (control). The CuSIA, when added, was added to the nylon 66 salt in an amount sufficient to provide a yarn containing either 68, 86, or 105 ppm of Cu. Each sample of each set of samples was dyed with one of ten dye formulation (5 disperse dye formulations and 5 acid dye formations) to a dye shade and the fading of each was measured after three ozone cycles. No two samples of the same set were dyed with the same dye formulation. For ease of comparison, the Gray Scale values were averaged for both the 5 disperse dyed and 5 acid dyed yarns of each set of samples. The results of the testing are given in the following table along with the denier per filament (dpf) of each yarn.

TABLE 1

| Sample Set | ppm Cu | dpf | Average Gray Scale Values of 5 Samples | |
|---|---|---|---|---|
| | | | Disperse Dyed | Acid Dyed |
| 1 | 0 | 6 | 3.1 | 3.5 |
| 2 | 68 | 6 | 3.3 | 3.5 |
| 3 | 0 | 10 | 3.2 | 3.8 |
| 4 | 86 | 10 | 3.8 | 3.7 |
| 5 | 0 | 18 | 3.4 | 3.8 |
| 6 | 68 | 18 | 3.6 | 3.8 |
| 7 | 0 | 18 | 3.2 | 3.0 |
| 8 | 105 | 18 | 3.5 | 3.3 |

The results in Table I show that CuSIA is an effective antiozonant for polyamide yarns and, particularly, for yarns dyed with disperse dyes.

EXAMPLE 3

In this example nylon 66 yarns of the invention were used in the construction of a saxony carpet. The carpet was then dyed with a disperse dye shade (i.e. beige) known to be especially sensitive to splotching in the presence of copper. Surprisingly, no splotching of the dyed carpet occurred.

Two, 1300 denier, 136 filament, 2 ply S-twist, bulked, continuous filament (BCF) nylon 66 yarns with 3.-Z-twist in the singles yarns and 2.75 S-twist in the ply were heatset in an autoclave by conventional techniques. One yarn (test) contained 70 ppm of copper added to the nylon 66 salt as CuSIA. The CuSIA was prepared in the manner described in Example 1. The other yarn (Control) contained 70 ppm of copper added to the nylon 66 salt as copper acetate monohydrate. Each yarn was tufted in a saxony construction (cut pile carpet) of 3/16 inch (0.48 cm) gauge, 6 stitches per inch (15.24/cm), ¾ inch (1.9 cm) pile height, 27.7 oz/yd² (0.94 kg/m²) pile weight in Typar primary backing with jute being used as the secondary backing. The test and control carpets were beck dyed to a splotch sensitive beige shade in a dye bath containing:

0.019% Artisil Blue Green (C.I. Disperse Blue 7)
0.034% Latyl Cerise YNL (C.I. Disperse Red 55)
0.022% Introsperse Yellow GBA (C.I. Disperse, Yellow 3)

The test carpet was dyed to a uniform beige shade, whereas the control carpet was splotched, in that, distinct areas of reddish and greenish casts were observed in the color of the control carpet pile surface.

EXAMPLE 4

This example illustrates the ozone fading resistance of carpet piling prepared from yarns of the present invention.

Test yarns containing 70 ppm of copper added as CuSIA were prepared in the same manner as the test yarn of Example 3. Control yarns were also prepared which were identical to the test yarns except that the CuSIA was omitted therefrom. Ten sets of carpet samples were made from the test and Control yarns. Each sample was dyed to one of ten dye shades with one of 20 dye formulations (10 disperse and 10 acid) and then the fading of each dyed sample was measured after three ozone cycles. Two separate formulations were used to achieve each dye shade, one disperse dye formulation and one acid dye formulation. The results of the evaluation are given below in Table II.

TABLE II

| Carpet Sample | Cu PPM | Gray Scale Value of Sample | | Dye Shade |
|---|---|---|---|---|
| | | Dispersed Dyed | Acid Dyed | |
| 1D-1A | 70 | 3 | 3 | Fern |
| 1C | 0 | 2.5 | 3 | Fern |
| 2D-2A | 70 | 3 | 3 | Fawn |
| 2C | 0 | 2.5 | 2.5 | Fawn |
| 3D-3A | 70 | 2.5 | 3 | Light Blue |
| 3C | 0 | 2 | 2.5 | Light Blue |
| 4D-4A | 70 | 2.5 | 2.5 | Beige |
| 4C | 0 | 2 | 2.5 | Beige |
| 5D-5A | 70 | 2.5 | 3 | Light Green |
| 5C | 0 | 2 | 2.5 | Light Green |
| 6D-6A | 70 | 2.5 | 2.5 | Gray |
| 6C | 0 | 2 | 2 | Gray |
| 7D-7A | 70 | 3 | 3.5 | Gold |
| 7C | 0 | 2 | 3 | Gold |
| 8D-8A | 70 | 2 | 3 | Spring Green |
| 8C | 0 | 2 | 2.5 | Spring Green |
| 9D-9A | 70 | 2.5 | 2 | Kentucky Green |
| 9C | 0 | 2 | 2 | Kentucky Green |
| 10D-10A | 70 | 3 | 3 | Royal Blue |
| 10C | 0 | 2.5 | 3 | Royal Blue |

The results of Table II clearly show the antiozonants of this invention effectively increase the ozone fading resistance of polyamide carpet yarns dyed with disperse dye shades. In the trade an increase of one-half Gray Scale is considered significant. The result also show that the antiozonants do not adversely effect the ozone fading resistance of acid dyed polyamide carpet yarns and in most instances enhance their ozone fading resistance.

Results similar to those obtained in the foregoing examples will be obtained with other polyamide yarns (e.g. nylon 6) and carpets prepared therefrom.

We claim:

1. A polyamide fiber having incorporated therein as an antiozonant a reaction product produced by reacting at least one 5-sulfoisophthalic acid of the formula

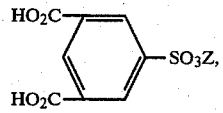

where Z is hydrogen, ammonia or an alkali metal, with at least one water soluble copper salt, wherein the amount of said reaction product incorporated in said fiber is an amount sufficient to provide from about 10 to about 100 parts per million of copper, based on the weight of the polyamide.

2. The fiber of claim 1 wherein said salt and said acid are reacted in a mole ratio ranging from about 0.5:1.0 to 1:1.

3. The fiber of claim 2 wherein Z is an alkali metal.

4. The fiber of claim 3 wherein the alkali metal is potassium.

5. The fiber of claim 4 wherein the water soluble copper salt is copper acetate.

6. The fiber of claim 1 wherein the polyamide is polyhexamethylene adipamide.

7. The fiber of claim 1 wherein the polyamide is polycaprolactam.

* * * * *